United States Patent
Talmon et al.

(10) Patent No.: US 8,004,563 B2
(45) Date of Patent: Aug. 23, 2011

(54) METHOD AND SYSTEM FOR EFFECTIVELY PERFORMING EVENT DETECTION USING FEATURE STREAMS OF IMAGE SEQUENCES

(75) Inventors: Gad Talmon, Givat Shmuel (IL); Zvi Ashani, Ganei Tikva (IL)

(73) Assignee: Agent Vi, Rosh-Haayin (IL)

( * ) Notice: Subject to any disclaimer, the term of this patent is extended or adjusted under 35 U.S.C. 154(b) by 846 days.

(21) Appl. No.: 10/501,949

(22) PCT Filed: Jul. 3, 2003

(86) PCT No.: PCT/IL03/00555
§ 371 (c)(1),
(2), (4) Date: Jul. 21, 2004

(87) PCT Pub. No.: WO2004/006184
PCT Pub. Date: Jan. 15, 2004

(65) Prior Publication Data
US 2005/0036659 A1    Feb. 17, 2005

(51) Int. Cl.
*H04N 7/18* (2006.01)
*H04N 7/12* (2006.01)
(52) U.S. Cl. .................................. 348/155; 375/240.08
(58) Field of Classification Search .................. 348/154, 348/155; 375/240.08
See application file for complete search history.

(56) References Cited

U.S. PATENT DOCUMENTS 6,069,655 A * 5/2000 Seeley et al. .................. 348/154
6,130,707 A 10/2000 Koller et al.
6,188,381 B1 2/2001 van der Wal et al.
6,266,369 B1 * 7/2001 Wang et al. .................. 375/240
6,349,114 B1 2/2002 Mory (Continued)

FOREIGN PATENT DOCUMENTS

| DE | 38 42 356 A1 | 6/1990 |
| EP | 1 107 609 A1 | 6/2001 |
| EP | 1 173 020 A2 | 1/2002 |

(Continued)

OTHER PUBLICATIONS

XP-010199874: Meyer, M., et al., "A New System for Video-Based Detection of Moving Objects and its Integration into Digital Networks", *IEEE*, pp. 105-110, (1996).

*Primary Examiner* — Jayanti K Patel
*Assistant Examiner* — Richard Torrente
(74) *Attorney, Agent, or Firm* — Spilman Thomas & Battle, PLLC (57) ABSTRACT

Method and system for performing event detection and object tracking in image streams by installing in field, a set of image acquisition devices, where each device includes a local programmable processor for converting the acquired image stream that consist of one or more images, to a digital format, and a local encoder for generating features from the image stream. These features are parameters that are related to attributes of objects in the image stream. The encoder also transmits a feature stream, whenever the motion features exceed a corresponding threshold. Each image acquisition device is connected to a data network through a corresponding data communication channel. An image processing server that determines the threshold and processes the feature stream is also connected to the data network. Whenever the server receives features from a local encoder through its corresponding data communication channel and the data network, the server provides indications regarding events in the image streams by processing the feature stream and transmitting these indications to an operator.

58 Claims, 5 Drawing Sheets

U.S. PATENT DOCUMENTS

| | | |
|---|---|---|
| 6,384,862 B1 | 5/2002 | Brusewitz et al. |
| 6,996,275 B2 * | 2/2006 | Edanami .................. 382/218 |
| 2002/0041626 A1 | 4/2002 | Yoshioka et al. |
| 2002/0054210 A1 | 5/2002 | Glier et al. |
| 2002/0062482 A1 * | 5/2002 | Bolle et al. .................... 725/105 |
| 2005/0146605 A1 * | 7/2005 | Lipton et al. ................. 348/143 |

FOREIGN PATENT DOCUMENTS

| | | |
|---|---|---|
| WO | 00/01140 A1 | 1/2000 |
| WO | 01/63937 A2 | 8/2001 |
| WO | 01/91353 A2 | 11/2001 |
| WO | 01/91353 A3 | 11/2001 |
| WO | 02/37429 A1 | 5/2002 |

* cited by examiner

METHOD AND SYSTEM FOR EFFECTIVELY PERFORMING EVENT DETECTION USING FEATURE STREAMS OF IMAGE SEQUENCES

FIELD OF THE INVENTION

The present invention relates to the field of video processing. More particularly, the invention relates to a method and system for obtaining meaningful knowledge, in real time, from a plurality of concurrent compressed image sequences, by effective pro ng of a large number of concurrent incoming image sequences and/or features derived from the acquired images.

BACKGROUND OF THE INVENTION

Many efforts have been spent to improve the ability to extract meaning data out of images captured by video and still cameras. Such abilities are being used in several applications, such as consumer, industrial, medical, and business applications. Many cameras are deployed in the streets, airports, schools, banks, offices, residencies—as standard security measures. These cameras are used either for allowing an operator to remotely view security events in real time, or for recording and analyzing a security event at some later time.

The introduction of new technologies is shifting the video surveillance industry into new directions that significantly enhance the functionality of such systems. Several processing algorithms are used both for real-time and offline applications. These algorithms are implemented on a range of platforms from pure software to pure hardware, depending on the application. However, these platforms are usually designed to simultaneously process a relatively small number of incoming image sequences, due to the substantial computational resources required for image processing. In addition, most of the common image processing systems are designed to process only uncompressed image data, such as the system disclosed in U.S. Pat. No. 6,188,381. Modern networked video environments require efficient processing capability of a large number of compressed video steams, collect from a plurality of image sources.

Increasing operational demands, as well as cost constraints created the need for automation of event detection. Such event detection solutions provide a higher detection level, save manpower, replace other types of sensors and lower false alarm rates.

Although conventional solutions am available for automatic intruder detection, license plate identification, facial recognition, traffic violations detection and other image based applications, they usually support few simultaneous video sources, using expensive hardware platforms that require field installation, which implies high installation, maintenance and upgrade costs.

Conventional surveillance systems employ digital video networking technology and automatic event detection. Digital video networking is implemented by the development of Digital Video Compression technology and the availability of IP based networks. Compression standards, such as MPEG-4 and similar formats allow transmitting high quality images with a relatively narrow bandwidth.

A major limiting factor when using digital video networking is bandwidth requirements. Because it is too expensive to transmit all the cameras all the time, networks are designed to concurrently transmit data, only from few cameras. The transmission of data only from cameras that are capturing important events at any given moment is crucial for establishing an efficient and cost effective digital video network.

Automatic video-based event detection technology becomes effective for this purpose. This technology consists of a series of algorithms that are able to analyze the camera image in real time and provide notification of a special event, if it occurs. Currently available event-detection solutions use conventional image processing methods, which require heavy processing resources. Furthermore, they allocate a fixed processing power (usually one processor) per each camera input. Therefore, such systems either provide poor performance due to resources limitation or are extremely expensive.

As a result, the needs of large-scale digital surveillance installations—namely, reliable detection, effective bandwidth usage, flexible event definition, large-scale design and cost, cannot be met by any of the current automatic event detection solutions.

Video Motion Detection (VMD) methods are disclosed, for example, in U.S. Pat. No. 6,349,114, WO 02/37429, in U.S. Patent Application Publication 2002,041,626, in U.S. Patent Application Publication No. 2002,054,210, in WO 01/63937, in EP1107609, in EP1173020, in U.S. Pat. No. 6,384,862, in U.S. Pat. No. 6,188,381, in U.S. Pat. No. 6,130,707, and in U.S. Pat. No. 6,069,655. However, all the methods described above have not yet provided satisfactory solutions to the problem of effectively obtaining meanings knowledge, in real time, from a plurality of concurrent image sequences.

It is an object of the present invention to provide a method and system for obtaining meaningful knowledge, from a plurality of concurrent image sequences, in real time.

It is another object of the present invention to provide a method and system for obtaining meaningful knowledge, from a plurality of concurrent image sequences, which are cost effective.

It is a further object of the present invention to provide a method and system for obtaining meaningful knowledge, from a plurality of concurrent image sequences, with reduced amount of bandwidth resources.

It is still another object of the present invention to provide a method and system for obtaining meaningful knowledge, from a plurality of concurrent image sequences, which is reliable, and having high sensitivity in noisy environments.

It is yet another object of the present invention to provide a method and system for obtaining meaningful knowledge, from a plurality of concurrent image sequences, with reduced installation and maintenance costs.

Other objects and advantages of the invention will become apparent as the description proceeds.

SUMMARY OF THE INVENTION

While these specifications discuss primarily video cameras, a person skilled in the art will recognize that the invention extends to any appropriate image source, such as still cameras, computer generated images, prerecorded video data, and the like, and that image sources should be equivalently considered. Similarly, the terms video and video stream, should be construed broadly to include video sequences, still pictures, computer generated graphics) or any other sequence of images provided or converted to an electronic format that may be processed by a computer.

The present invention is directed to a method for performing event detection and object tracking in image streams. A set of image acquisition devices is installed in field, such that each device comprises a local programmable processor for converting the acquired image stream, that consists of one or more images, to a digital format, and a local encoder, for generating features from the mage stream. The features are parameters that are related to attributes of objects in the image stream. Each device transmits a feature stream, whenever the number and type of features exceed a corresponding threshold. Each image acquisition device is connected to a data network through a corresponding data communication channel. An image processing server connected to the data network determines the threshold and processes the feature stream. Whenever the server receives features from a local encoder through its corresponding data communication channel and the data network, the server obtains indications regarding events in the image streams by processing the feature stream and transmitting the indications to an operator.

The local encoder may be a composite encoder, which is a local encoder that further comprises circuitry for compressing the image stream. The composite encoder may operate in a first mode, during which it generates and transmits the features to the server, and in a second mode, during which it transmits to the server, in addition to the features, at least a portion of the image stream in a desired compression level, according to commands sent from the server. Preferably, each composite encoder is controlled by a command sent from the server, to operate in its first mode. As long as the server receives features from a composite encoder, that composite encoder is controlled by a command sent from the server, to operate in its second mode. The server obtains indications regarding events in the image streams by processing the feature stream, and transmitting the indications and/or their corresponding image streams to an operator.

Whenever desired one or more compressed image streams containing events are decoded by the operator station, and the decoded image streams are transmitted to the display of an operator, for viewing. Compressed image streams obtained while their local encoder operates in its second mode may be recorded.

Preferably, additional image processing resources, in the server, are dynamically allocated to data communication duels that receive image streams. Feature streams obtained while operating in the first mode may comprise only a portion of the image.

A graphical polygon that encompasses an object of interest being within the fame of an image or an AOI (Area Of Interest) in the image may be generated by the server and displayed to an operator for viewing. In addition, the server may generate and display a graphical trace indicating the history of movement of an object of interest, being within the frame of an image or an AOI in the image.

The image stream may be selected from the group of images that comprises video streams, still images, computer generated images, and pre-recorded digital, analog video data, or video streams, compressed using MPEG format. The encoder may use different resolution and frame rate during operation in each mode.

Preferably, the features may include motion features, color, portions of the image, edge data and frequency related information.

The server may perform, using a feature stream, received from the local encoder of at least one image acquisition device, one or more of the following operations and/or any combination thereof:

License Plate Recognition (LPR);
Facial Recognition (FR);
detection of traffic rules violations;
behavior recognition;
fire detection;
traffic flow detection;
smoke detection.

The present invention is also directed to a system for performing event detection and object tracking in image streams, that comprises:

a) a set of image acquisition devices, installed in field, each of which includes:
   a.1) a local programmable processor for converting the acquired image stream, to a digital format
   a.2) a local encoder, for generating, from the image stream, features, being parameters related to attributes of objects in the image stream, and for transmitting a feature stream, whenever the motion features exceed a corresponding threshold;
b) a data network, to which each image acquisition device is connected through a corresponding data communication channel; and
c) an image processing server connected to the data network, the server being capable of determining the threshold, of obtaining indications regarding events in the image streams by processing the feature stream, and of transmitting the indications to an operator.

The system may further comprise an operator display, for receiving and displaying one or more image streams that contain events, as well as a network video recorder for recording one or more image streams, obtained while their local encoder operates in its first mode.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

A significant saving in system resources can be achieved by applying novel data reduction techniques, proposed by the present invention. In a situation where thousands of cameras are connected to a single server, only a small number of the cameras actually acquire important events that should be analyzed. A large-scale system can function properly only if it has the capability of identifying the inputs that may contain useful information and perform further processing only on such inputs. Such a filtering mechanism requires minimal processing and bandwidth resources, so that it is possible to apply it concurrently on a large number of image streams. The present invention proposes such a filtering mechanism, called Massively Concurrent Image Processing (MCIP) technology that is based on the analysis of incoming image sequences and/or feature streams, derived from the acquired images, so as to fulfill the need for automatic image detection capabilities in a large-scale digital video network environment.

MCIP technology combines diverse technologies such as large scale data reduction, effective server design and optimized image processing algorithms, thereby offering a platform that is mainly directed to the security market and is not rivaled by conventional solutions, particularly with vast numbers of potential users. MCIP is a networked solution for event detection in distributed installations, which is designed for large scale digital video surveillance networks that concurrently support thousands of camera inputs, distributed in an arbitrarily large geographical area and with real time performance. MCIP employs a unique feature transmission method that consumes narrow bandwidth, while maintaining high sensitivity and probability of detection. MCIP is a server-based solution that is compatible with modern monitoring and digital video recording systems and carries out complex detection algorithms, reduces field maintenance and provides improved scalability, high availability, low cost per channel and backup utilities. The same system provides concurrently multiple applications such as VMD, LPR and FR. In addition, different detection applications may be associated with the same camera.

MCIP is composed of a server platform with various applications, camera encoders (either internal or eternal to the camera), a Network Video Recorder (NVR) and an operator station. The server contains a computer that includes proprietary hardware and software components. MCIP is based on the distribution of image processing algorithms between low-level feature extraction, which is performed by the encoders which are located in field (i.e., in the vicinity of a camera), and high-level processing applications, which are performed by a remote central server that collects and analyzes these features.

The MCIP system described hereafter solves not only the bandwidth problem but also reduces the load from the server and uses a unique type of data stream (not a digital video stream), and performs an effective process for detecting events at real time, in a large scale video surveillance environment.

A major element in MOP is data reduction, which is achieved by the distribution of the image processing algorithms. Since all the video sources, which require event detection, transmit concurrently, the required network bandwidth is reduced by generating a reduced bandwidth feature stream 201 in the vicinity of each camera. In order to detect, track, classify and analyze the behavior of objects present in video sources, there is no need to transmit full video streams, but only partial data, which contains information regarding describing basic attributes of each video scene.

By doing so, a significantly smaller data bandwidth is used, which reduces the demands for both the network bandwidth and the event detection processing power. Furthermore, if only the shape, size, direction of movement and velocity should be detected, there is no need to transmit data regarding their intensity or color, and thus, a further bandwidth reduction is achieved. Another bandwidth optimization may be achieved if the encoder in the transmitting side filters out all motions which are under a motion threshold, determined by the remote central server 203. Such threshold may be the amount of motion in pixels between two consecutive frames, and may be determined and changed dynamically, according to the attributes of the acquired image, such as resolution, AOI, compression level, etc. Areas of movement which are under the threshold are considered either as noise, or non-interesting motions.

One method for extracting features at the encoder side is by slightly modifying and degrading existing temporal-based video compressors which were originally designed to transmit digital video. The features may also be generated by a specific feature extraction algorithm (such as any motion vector generating algorithm) that is not related to the video compression algorithm. When working in this reduced bandwidth mode, the output streams of these encoders are definitely not a video stream, and therefore cannot not be used by any receiving party to produce video images.

Figure 1:
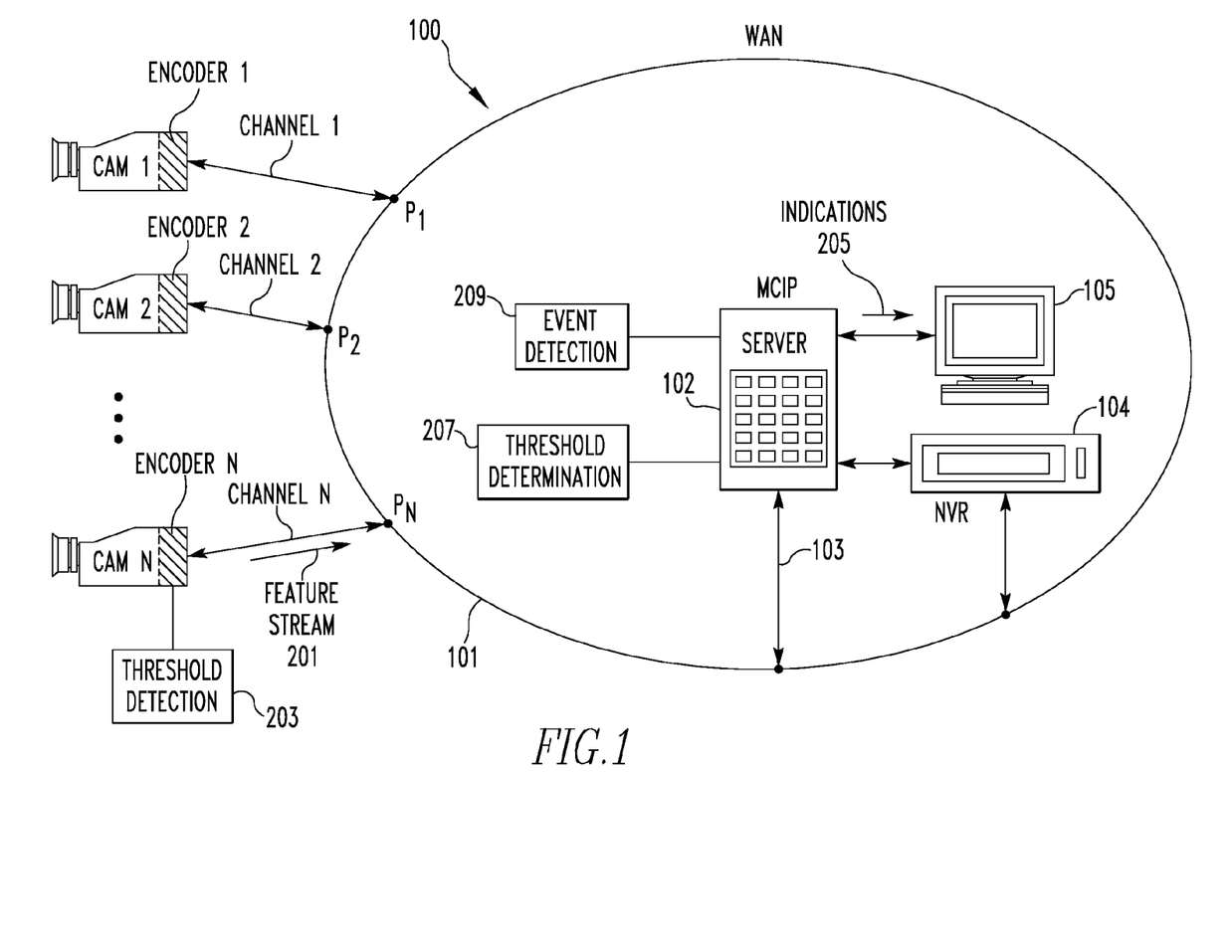
FIG. 1 schematically illustrates the structure of a surveillance system that comprises a plurality of cameras connected to a data network, according to a preferred embodiment of the invention.

FIG. 1 schematically illustrates the structure of a surveillance system that comprises a plurality of cameras connected to a data network, according to a preferred embodiment of the invention. The system 100 comprises n image sources (in this example, n cameras, CAM1, . . . , CAMn), each of which connected to a digital encoder ENC j, for converting the images acquired by CAM} to a compressed digital format. Each digital encoder ENC j is connected to a digital data network 101 at point Pj and being capable of transmitting data, which may be a reduced bandwidth feature stream 201 or a full compressed video stream, through its corresponding channel Cj. The data network 101 collects the data transmitted from all channels and forwards them to the MCIP server 102, through data-bus 103. MCIP server 102 processes the data received from each channel and controls one or more cameras which transmit any combination of the reduced bandwidth feature stream and the full compressed video stream, which can be analyzed by MCIP server 102 in real time, or recorded by NVR 104 and analyzed by MCIP server 102 later. An operator station 105 is also connected to MCIP server 102, for real time monitoring of selected full compressed video streams 205. Operator station 105 can manually control the operation of MCIP server 102, whenever desired.

The MCIP (Massively Concurrent Image Processing) server is connected to the image sources (depicted as cameras in the drawing, but may also be any image source, such taped video, still cameras, video cameras, computer generated images or graphics, and the like.) through data-bus 103 and network 101, and receives features or images in a compressed format. In the broadest sense this is any type of network, wired or wireless. The images can be compressed using any type of compression. Practically, WP based networks are used, as well as compression schemes that use DCT, VideoLAN Client (VLC, which is a highly portable multimedia player for various audio and video formats as well as Digital Versatile Discs (DVDs), Video Compact Discs (VCDs), and various streaming protocols, disclosed in WO 01/63937) and motion estimation techniques such as MPEG.

The system 100 uses an optional load-balancing module that allows it to easily scale the number of inputs that can be processed and also creates the ability to remove a single point of failure, by creating backup MCIP servers. The system 100 also has a configuration component that is used for defining the type of processing that should be performed for each input and the destination of the processing res. The destination can be another computer, an email address, a monitoring application, or any other device that is able to receive textual and/or visual messages.

The system can optionally be connected to an external database to assist image processing. For example, a database of suspect, stolen cars, of license plate numbers can be used for identifying vehicles.

Figure 2:
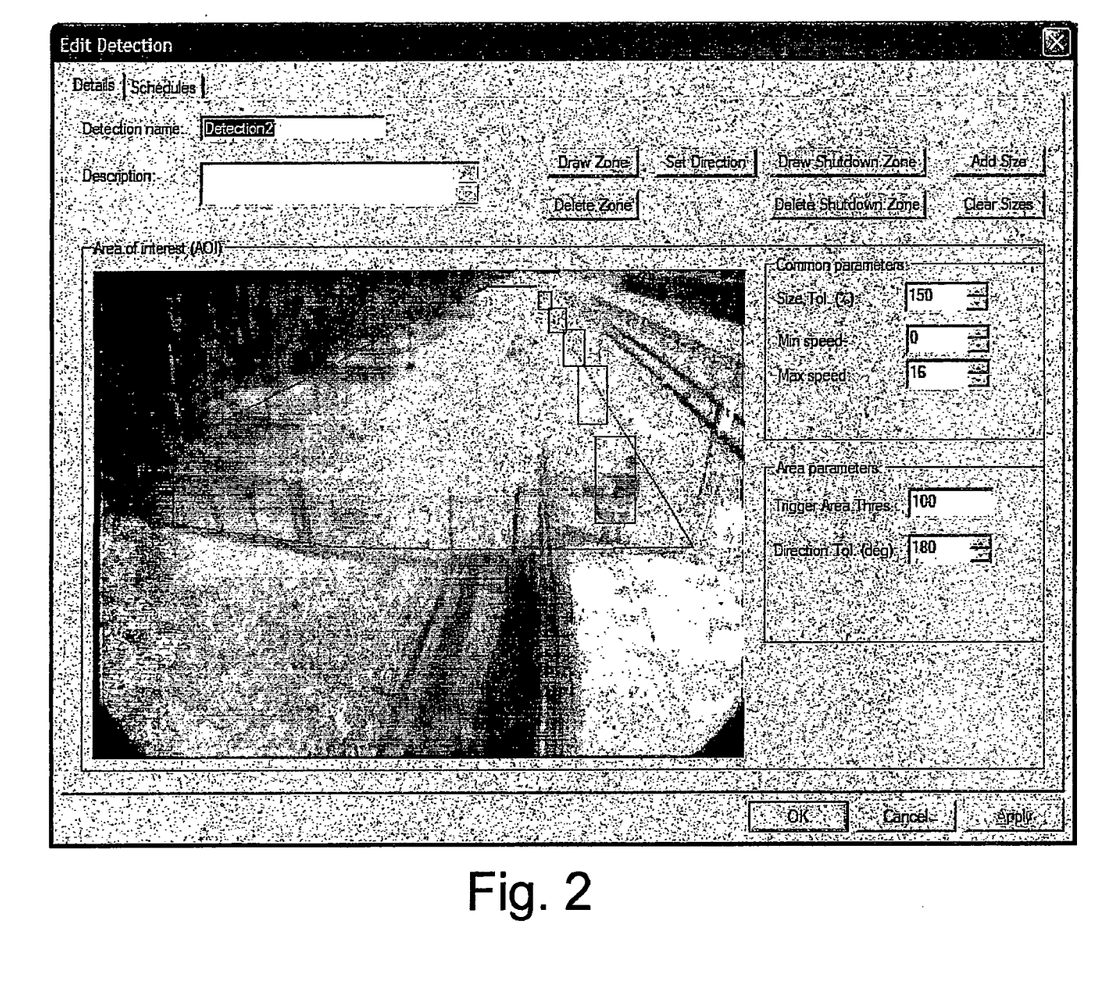
FIG. 2 illustrates the use of AOI's (Area of Interest) for designating areas where event detection will be performed and for reducing the usage of system resources, according to a preferred embodiment of the invention.

FIG. 2 illustrates the use of AOI's (Area of Interest) for reducing the usage of system resources, according to a preferred embodiment of the invention. An AOI is a polygon (in this Fig., a hexagon) that encloses the area where detection will occur. The rectangles indicate the estimated object size at various distances from the camera. In this example, the scene of interest comprises detection movement of a person in a field (shown in the first rectangle). It may be used in the filtering unit to decide if further processing is required. In this case, the filtering unit examines the feature data. The feature stream is analyzed to determine if enough significant features lie within the AOI. If the number of features that are located inside the AOI and comprise changes, exceeds the threshold 207 then this frame is designated as possibly containing an event and is transferred for further processing. Otherwise, the frame is dropped and no further processing is performed.

The MCIP server receives the reduced bandwidth feature stream (such a feature stream is not a video stream at all, and hence, no viewable image can be reconstructed thereof) from all the video sources which require event detection. When an event is detected 209 within a reduced bandwidth stream that is transmitted from a specific video source, the central server may instruct this video source to change its operation mode to a video stream mode, in which that video source may operate as a regular video encoder and transmits a standard video stream, which may be decoded by the server or by any receiving party for observation, recording, further processing or any other purpose. Optionally the video encoder also continues transmitting the feature stream at the same time.

Working according to this scheme, most of the video sources remain in the reduced bandwidth mode, while transmitting a narrow bandwidth data stream, yet sufficient to detect events with high resolution and frame rate at the MCIP server. Only a very small portion of the sources (in which event is detected) are controlled to work concurrently in the video stream mode. This results in a total network bandwidth, which is significantly lower than the network bandwidth required for concurrently transmitting from all the video sources.

For example, if a conventional video surveillance installation that uses 1000 cameras, a bandwidth of about 500 Kbp/s is needed by each camera, in order to transmit at an adequate quality. In the reduced bandwidth mode, only about 5 Kbp/s is required by each camera for the transmission of information regarding moving objects at the same resolution and frame rate. Therefore, all the cameras working in this mode are using a total bandwidth of 5 Kbp/s times 1000=5 Mbp/s. Assuming that at steady state suspected objects appear in 1% of the cameras (10 cameras) and they are working in video strum mode, extra bandwidth of 10 times 500 Kbp/s=5 Mbp/s is required. Thus, the total required network bandwidth using the solution proposed by the present invention is 10 Mbp/s. A total required network bandwidth of 500 Mbp/s would be consumed by conventional systems, if all the 1000 cameras would concurrently transmit video streams.

The proposed solution may be applicable not only for high-level moving objects detection and tracking in live cameras but also in recorded video. Huge amounts of video footage are recorded by many surveillance systems. In order to detect interesting events in this recorded video, massive processing capabilities are needed. By converting recorded video, either digital or analog, to a reduced bandwidth stream according to the techniques described above, event detection becomes much easier, with lower processing requirements and faster operation.

The system proposed in the present invention comprises the following components:
1. One or more MCIP servers
2. One or more dual mode video encoders, which may be operated at reduced bandwidth mode or at video stream mode, according to remote instructions.
3. Digital network, LAN or WAN, IP or other, which establishes communication between the system components.
4. One or more operator stations, by which operators may define events criteria and other system parameters and manage events in real time.
5. An optional Network Video Recorder (NVR), which is able to record and play, on demand, any selected video source which is available on the network.

Implementation for Security Applications:

Following is a partial list of types of image processing applications which can be implemented very effectively using the method proposed by the present invention:

Video Motion Detection—for both indoor and outdoor applications. Such application is commonly used to detect intruders to protected zones. It is desired to ignore nuisances such as moving trees, dust and animals. In this embodiment of the present invention manipulates input images at the stream level in order to filter out certain images and image changes. Examples of such filtering are motion below a predetermined threshold, size or speed related filtering all preferably applied within the AOIs, thus reducing significantly the amount of required system resources for further processing. Since the system is server-based and there is no need for installation of equipment in the field (except the camera), this solution is very attractive for low budget application such as in the residential market.

Exceptional static objects detection—this application is used to detect static objects where such objects may require an alarm, By way of example, such objects may comprise an unattended bag at the airport, a stopped car on a highway, a person stopped at a protected location and the like. In this embodiment the present invention manipulates the input images at the stream level and examines the motion vectors at the AOIs. Objects that stopped moving are further processed.

License Plate Recognition—this application is used for vehicles access control, stolen or suspected car detection and parking automation. In this embodiment, it is possible to detect wanted cars using hundreds or more cameras installed in the field, thus providing a practical detection solution.

Facial Recognition—this application is desired for biometric verification or detection device, for tasks such as locating criminals or terrorists and for personal access control purposes. Using this embodiment offers facial recognition capability to many cameras in the field. This is a very useful tool for large installations such as airports and public surveillance.

Smoke and flames detection—this application is used for fire detection. Using this embodiment of the invention, all the sites equipped with cameras may receive this service in addition to other application without any installation of smoke or flame detectors.

Traffic violations—this application detect a variety of traffic violation such as red light crossing, separation line crossing, parking or stopping at forbidden zone and the like. Using this embodiment, this functionality may be applied for many cameras located along roads and intersections, thus significantly optimizing police work.

Traffic flow analysis—this application is useful for traffic centers by automatically detecting any irregular traffic events such as traffic obstacles, accidents, too slow or too fast or too crowded traffic and the like. Using this embodiment, traffic centers may use many cameras located as desired at the covered area in order to provide a significantly better control level.

Suspicious vehicle or person tracking—this application is used to track objects of interest. This is needed to link a burglar to an escape car, locate a running suspect and more. Using this embodiment, this functionality may be associated with any selected camera or cameras in the field.

It should be noted that each of those applications or their combination may each be considered as a separate embodiment of the invention, all while using the basic structure contemplated herein, while specific embodiments may utilize specialized components. Selection of such component and the combination of features and applications provided herein is a matter of technical choice that will be clear to those skilled in the art.

Figure 3A:
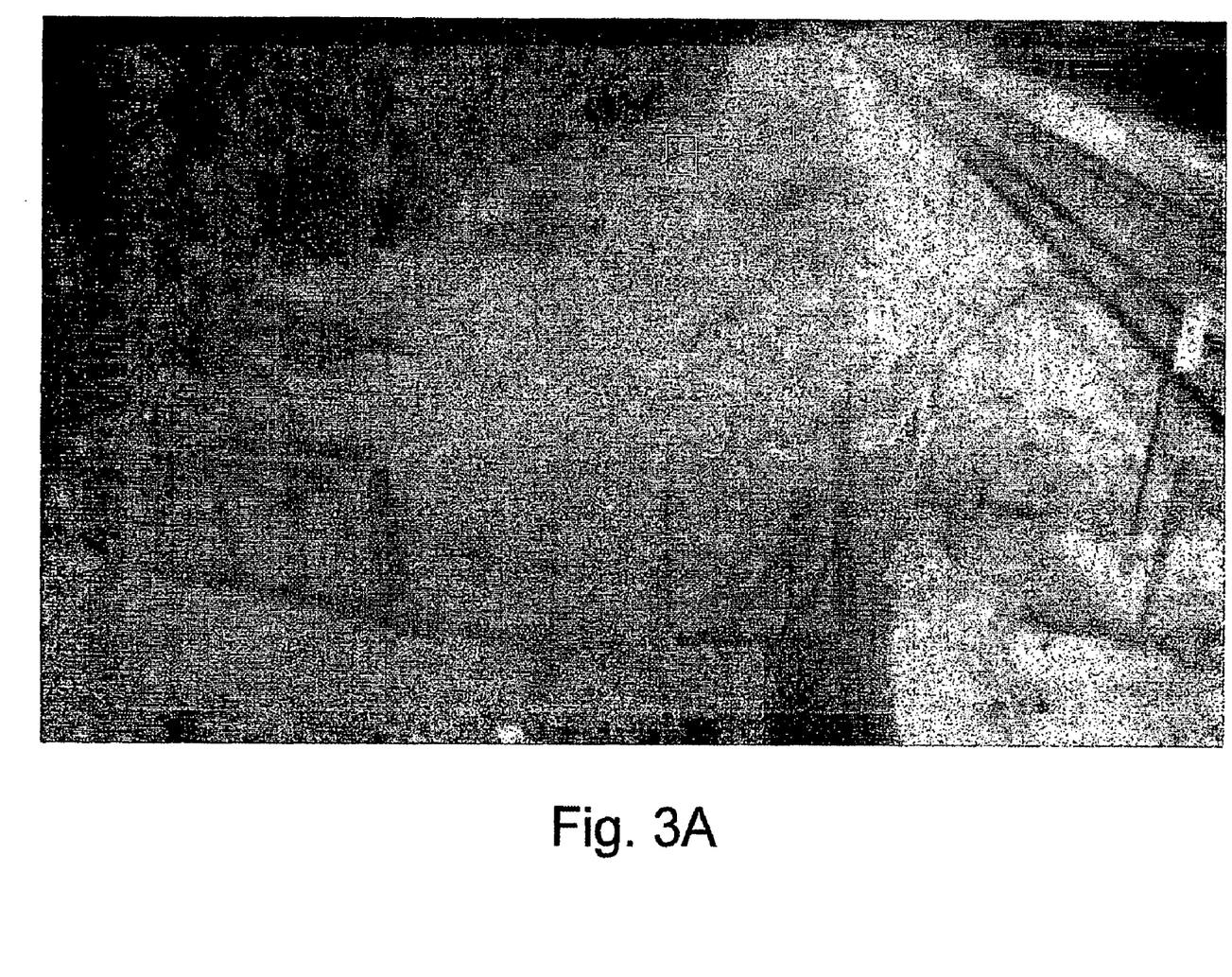
FIGS. 3A to 3C illustrates the generation of an object of interest and its motion trace, according to a preferred embodiment of the invention.
Figure 3B:
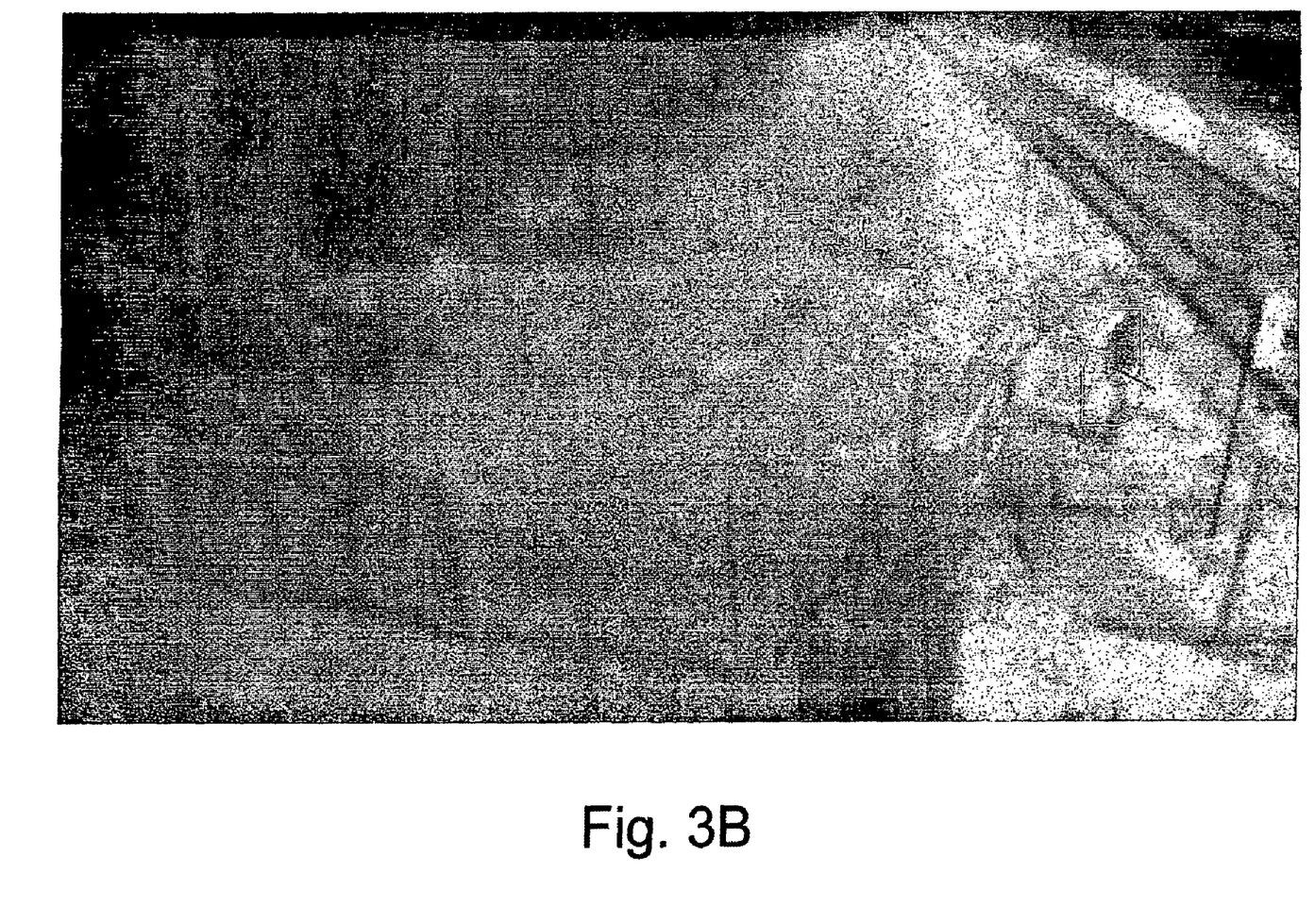
Figure 3C:
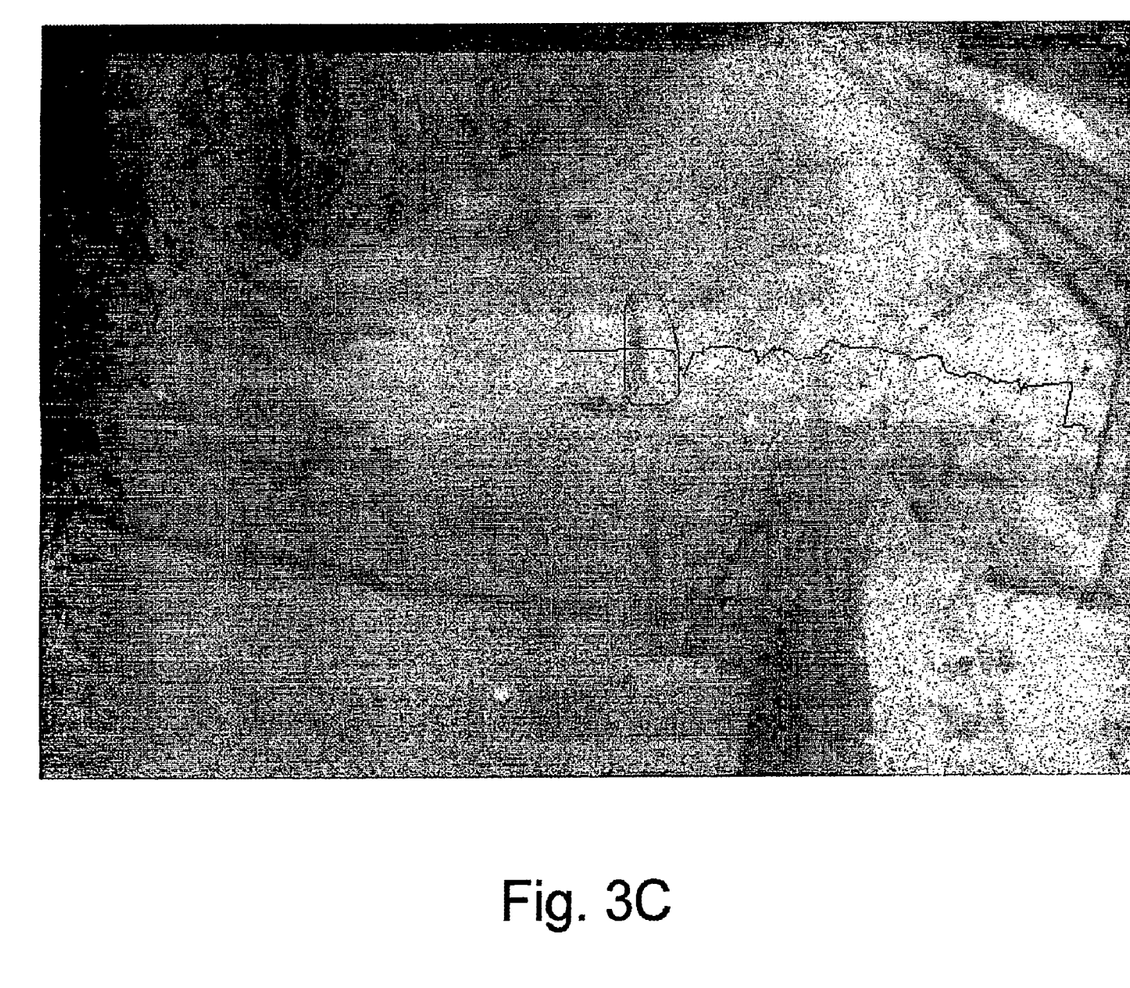

FIGS. 3A to 3C illustrate the generation of an object of interest and its motion trace, according to a preferred embodiment of the invention. FIG. 3A is an image of a selected AOI (in this example, an elongated zone, in which the presence of any person is forbidden), on which the MCIP server 102 generates an object, which is determined according to redefined size and motion parameters, received from the corresponding encoder. The object encompasses the body of a person, penetrating into the forbidden zone and walking from right to left. The motion parameters are continuously updated, such that the center of the object is tracked. The MCIP server 102 generates a trace (solid line) that provides a graphical indication regarding his motion within the forbidden zone. FIG. 3B is an image of the same selected AOI, on which the MCIP server 102 generates the object and the trace (solid line) that provides a graphical indication regarding his motion within the forbidden zone from left to right and more closely to the camera. FIG. 3C is an image of the same selected AOI, on which the MCIP server 102 generates the object and the trace (solid line) that provides a graphical indication regarding his motion within the forbidden zone again from right to left and more closely to the camera. The filtration performed by the corresponding encoder prevents the generation of background movements, such as tree-tops and lower vegetation, which are considered as background noise.

The above examples and description have of course been provided only fir the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. Method for performing event detection and object tracking in an image stream, wherein an event is defined as the occurrence of a type of activity in field which requires some type of action in response thereto, said method comprising:
   a) installing in the field, an image acquisition device for acquiring an image stream and comprising a local programmable processor for converting the acquired image stream, consisting of one or more images, to a digital format, and a local encoder, preprogrammed to operate with an image processing server via a data network on the basis of distribution of image processing algorithms between the local encoder and the server, said local encoder being operable to apply low-level feature extraction to the digital format of said image stream, and upon identifying that a number and type of features in the image stream exceed corresponding threshold, selectively generating, from said image stream, a feature stream including parameters related to attributes of areas in said image stream, for transmitting said feature stream via the data network to the image processing server; and
   b) connecting said image acquisition device to the data network through a corresponding data communication channel, to enable the operation of the encoder by the image processing server and transmission of the feature stream from the image acquisition device to the image processing server, thereby actuating high-level processing applications at the image processing server applied to the feature stream to detect the event and obtain an indication about the detected event; and
   c) transmitting the indications from the image processing server to an operator.

2. Method according to claim 1, wherein the local encoder is a composite encoder, which comprises circuitry for compressing the image stream, and further comprising:
   a) operating said composite encoder in a first mode, during which it generates and transmits said feature stream to said image processing server, and
   b) operating said composite encoder in a second mode responsive to detecting said events, during which it transmits to said image processing server, in addition to said feature stream, at least a portion of said image stream in a desired compression level, according to commands sent from said image processing server.

3. Method according to claim 2, further comprising recording one or more compressed image streams obtained while said local encoder operates in said second mode.

4. Method according to claim 2, further comprising dynamically allocating additional image processing resources, in the server, to data communication channels that receive image streams.

5. Method according to claim 4, further comprising generating and displaying a graphical polygon that encompasses an object of interest, being within at least one of a frame of an image and an area of interest in said image.

6. Method according to claim 5, further comprising generating and displaying a graphical trace indicating the history of movement of an object of interest, being within at least one of the frame of an image and an area of interest in said image.

7. Method according to claim 1, further comprising decoding one or more compressed image streams containing events by said server, and transmitting the decoded image streams to the display of an operator, for viewing.

8. Method according to claim 1, wherein the image stream is selected from a group of images that comprises video streams, still images, computer generated images, pre-recorded digital video data and analog video data.

9. Method according to claim 1, wherein the image streams are video streams, compressed using MPEG format.

10. Method according to claim 1, wherein the feature stream includes at least one of:
   a motion feature;
   foreground feature
   a color feature;
   edge data; and
   frequency related information.

11. Method according to claim 1, further comprising performing, by the server, at least one of:
   License Plate Recognition (LPR);
   Facial Recognition (FR);
   detection of traffic rules violations;
   behavior recognition;
   fire detection;
   traffic flow detection; and
   smoke detection,
   using the feature stream received from the image acquisition device, through the data communication channel.

12. Method according to claim 1 wherein said feature stream further comprises a motion feature, said motion feature being encoded in said feature stream only when said motion feature exceeds a predetermined threshold.

13. System for use in performing event detection and object tracking in image streams, wherein an event is defined as the occurrence of a type of activity in field which requires some type of action in response thereto, said system comprising:
- a) an image acquisition device for installation in the field, the image acquisition device comprising:
  - a.1) a local programmable processor for converting the acquired image stream to a digital format; and
  - a.2) a local encoder, preprogrammed to operate with an image processing server via a data network on the basis of distribution of image processing algorithms between the image acquisition device and the server, said local encoder being operable for applying a low-level feature extraction to the image stream and, upon identifying that a number and type of features in the image stream exceed corresponding threshold, selectively generating, from said image stream, a feature stream including parameters related to attributes of areas in said image stream;
- b) a data communication channel connecting the image acquisition device to the data network and operable for transmitting the feature stream generated by the local encoder to the image processing server, thereby actuating high-level processing applications at the image processing server to detect the event in the field;
- c) a remote image processing server connected to said data network, said remote image processing server receiving said feature stream transmitted by said local encoder; and
- d) said remote image processing server applying a high-level processing to the received feature stream and detecting said event from analyzing said feature stream, and transmitting indications regarding said event to an operator.

14. System according to claim 13, wherein said local encoder is a composite encoder and further comprises circuitry for compressing said image stream, said composite encoder having a first operating mode, during which it generates and transmits said feature stream to said remote image processing server, and having a second operating mode, during which said composite encoder transmits to said remote image processing server, in addition to said feature stream, at least a portion of said image stream in a desired compression level, according to commands sent from said remote image processing server.

15. System according to claim 14, further comprising a network video recorder for recording one or more image streams obtained while said composite encoder operates in said second mode.

16. System according to claim 14, in which said portion of said image stream obtained while operating in the second mode, comprises only a portion of the image that corresponds to a desired area of interest.

17. System according to claim 14, further comprising the remote image processing server decoding said portion of said image stream and determining said portion of said image stream contains an event; and
   an operator display, for receiving said portion of said image stream, containing the event from the remote image processing server.

18. System according to claim 17, in which the remote image processing server is capable of dynamically allocating image processing resources to said data communication channel when said data communication channel receives said portion of said image stream.

19. System according to claim 17, in which the remote image processing server further comprises processing means for generating and displaying a graphical polygon that encompasses an object of interest, being within at least one of a frame of an image and an area of interest in said image when said composite encoder is in said second operating mode.

20. System according to claim 19, in which the remote image processing server further comprises processing means for generating and displaying a graphical trace indicating the history of movement of an object of interest, being within at least one of the frame of said image and the area of interest of said image.

21. System according to claim 13, in which the image stream is selected from the group of images that comprises video streams, still images, computer generated images, and pre-recorded digital or analog video data.

22. System according to claim 13, in which the image stream is a video stream compressed using MPEG format.

23. System according to claim 13, in which the feature stream includes at least one of:
   a motion feature;
   a color feature;
   edge data; and
   frequency related information.

24. System according to claim 17, in which the remote image processing server further comprises processing means for performing at least one of:
   License Plate Recognition (LPR);
   Facial Recognition (FR);
   detection of traffic rules violations;
   behavior recognition;
   fire detection;
   traffic flow detection; and
   smoke detection;
   using the feature stream received from the local encoder of the image acquisition device, through the data communication channel.

25. System according to claim 13 wherein said feature stream further comprises a motion feature, said motion feature being encoded in said feature stream only when said motion feature exceeds a predetermined threshold.

26. A distributed image processing method for effectively performing event detection in a large number of concurrent image sequences, wherein an event is defined as the occurrence of a type of activity in fields which requires some type of action in response thereto, said method comprising:
- a) performing low level feature extraction by encoders associated with image acquisition devices installed in the fields, said low level feature extraction comprising:
  - i) receiving image streams from the image acquisition devices installed in the fields and generating digital data indicative thereof;
  - ii) processing the digital data indicative of the image stream, said processing comprising feature extraction and, upon identifying that a number and type of features in the image stream exceed a corresponding threshold, selectively generating a corresponding feature stream having a bandwidth narrower than that of the corresponding image stream, features in said feature stream including parameters related to attributes of areas in the respective image stream;
- b) transmitting said reduced bandwidth feature stream from the image acquisition devices to a common remote image processing server, thereby actuating the image processing server for applying high level image processing to the feature stream and detecting events in the fields, and transmitting indications regarding said events to an operator.

27. The method of claim 26 further comprising transmitting to said remote image processing server at least a portion of an image stream from any of said plurality of image acquisition devices associated with the reduced bandwidth feature stream in which said remote image processing server detects an event.

28. The method of claim 27, wherein said high level image processing comprises: receiving said reduced bandwidth feature stream transmitted from each of said plurality of image acquisition devices, analyzing each said reduced bandwidth feature stream at said remote image processing server, and detecting events in each said image stream based upon said analyzing of each said reduced bandwidth feature stream by said remote image processing server, and displaying said image stream in which an event is indicated on a display screen of an operator at said remote image processing server.

29. The method of claim 28 wherein said high level image processing comprises performing, by said remote image processing server, at least one of:
   License Plate Recognition (LPR);
   Facial Recognition (FR);
   detection of traffic rules violations;
   behavior recognition;
   fire detection;
   traffic flow detection; and
   smoke detection;
   using said reduced bandwidth feature stream received from at least one of said plurality of image acquisition devices.

30. The method of claim 26 wherein said selective extraction comprises selectively encoding features in said reduced bandwidth feature stream only when at least one of a number and type of said features exceed a predetermined threshold, wherein said threshold is applied to said image acquisition device to control when said encoder generates and transmits said feature stream, and said number and type of features exceeding said threshold are indicative of activity to be further analyzed by said remote image processing server in order to detect said event.

31. The method of claim 30 wherein said transmitting said reduced bandwidth feature stream to said remote image processing server occurs only when said number and type of features exceed said predetermined threshold.

32. The method of claim 30 wherein said features further comprise motion features, and said motion features are encoded in said reduced bandwidth feature stream only when said motion features exceed said predetermined threshold.

33. The method of claim 30 wherein said predetermined threshold is set by said remote server.

34. The method of claim 30 further comprising transmitting to said remote image processing server at least a portion of an image stream from any of said plurality of image acquisition devices associated with the reduced bandwidth feature stream in which said remote image processing server detects an event.

35. The method of claim 34 further comprising generating and displaying a graphical polygon that encompasses an object of interest within at least one of a frame of said at least a portion of an image and an area of interest in said at least a portion of an image.

36. The method of claim 35 further comprising generating and displaying a graphical trace indicating the history of movement of said object of interest.

37. The method of claim 26 further comprises recording said image stream when said event is detected therein.

38. The method of claim 26 wherein said image stream is selected from a group of images comprising video streams, still images, computer generated images, pre-recorded digital video data and pre-recorded analog video data.

39. The method of claim 26 wherein said features stream comprises at least one of:
   a motion feature;
   a color feature;
   edge data; and
   frequency related information.

40. A distributed image processing system for effectively performing event detection in a large number of concurrent image sequences, said distributed image processing system having an in field component and a remote component, wherein an event is defined as the occurrence of a type of activity which requires some type of action in response thereto, said distributed image processing system comprising:
   a) a low level feature extraction component located in field, said low level feature extraction component comprising:
      a plurality of image acquisition devices installed in field, each producing an image stream;
      a processor and an encoder associated with each of said plurality of image acquisition devices;
      said processor converting said image stream to a digital format;
      said encoder applying a low-level feature extraction to the image stream and upon identifying that a number and type of features in the image stream exceed corresponding threshold selectively generating from the image stream a reduced bandwidth feature stream including parameters related to attributes of areas in said image stream;
   b) a remote high level image processing component comprising a remote image processing server;
   c) a data network with which said low level feature extraction component communicates with said remote image processing server, each of said plurality of image acquisition devices and associated encoders communicating with said data network through a corresponding data communication channel;
   d) said encoder transmitting said reduced bandwidth feature stream to said remote image processing server;
   e) said remote image processing server analyzing said reduced bandwidth feature stream and detecting said events associated with said image stream; and
   f) wherein, upon detecting said event from the feature stream, said remote image processing server causes at least a portion of the corresponding image stream associated with said events to be transmitted to said remote image processing server.

41. The system of claim 40 wherein said encoder comprises a composite encoder which incorporates said processor, and further comprises circuitry for compressing said image stream, said composite encoder having a first operating mode during which said composite encoder transmits said reduced bandwidth feature stream to said remote image processing server, and a second operating mode during which said composite encoder transmits to said remote image processing server, in addition to said reduced bandwidth feature stream, at least a portion of said image stream in a desired compression level, according to commands sent from said remote image processing server, said remote image processing server controlling said composite encoder to operate in said second operating mode responsive to detecting said events.

42. The system of claim 41 further comprising an operator display for receiving from said remote image processing server said image stream in which said event is detected.

43. The system of claim 42 wherein said remote image processing server further comprises a programmable processor for generating and displaying on said operator display a graphical polygon that encompasses an object of interest within at least one of a frame of said at least a portion of an image and an area of interest in said at least a portion of an image.

44. The system of claim 43 wherein said remote image processing server generates and displays on said operator display a graphical trace indicating a history of movement of said object of interest.

45. The system of claim 41 further comprising a network video recorder associated with each of said plurality of image acquisition devices for recording said image stream when said composite encoder operates in said second operating mode.

46. The system of claim 41 wherein said remote image processing server dynamically allocates additional image processing resources to data communication channels receiving said image stream.

47. The system of claim 40 wherein said features are encoded in said reduced bandwidth feature stream only when at least one of a number and type of said features exceed a predetermined threshold, wherein said threshold is applied to said image acquisition device to control when said encoder generates and transmits said feature stream, and said number and type of features exceeding said threshold are indicative of activity to be further analyzed by said remote image processing server in order to detect said event.

48. The method of claim 47 wherein said reduced bandwidth feature stream is transmitted to said remote image processing server only when said number and type of features exceed said predetermined threshold.

49. The system of claim 47 wherein said features further comprise motion features, and said motion features are encoded in said reduced bandwidth feature stream only when said motion features exceed said predetermined threshold.

50. The system of claim 47 wherein said predetermined threshold is established by said remote image processing server.

51. The system of claim 40 wherein said image stream is selected from a group of images comprising video streams, still images, computer generated images, pre-recorded digital video data and pre-recorded analog video data.

52. The system of claim 40 wherein said features stream comprises at least one of:
   a motion feature;
   a color feature;
   edge data; and
   frequency related information.

53. The system of claim 40 wherein said remote image processing server performs at least one of:
   License Plate Recognition (LPR);
   Facial Recognition (FR);
   detection of traffic rules violations;
   behavior recognition;
   fire detection;
   traffic flow detection; and
   smoke detection;
   using said reduced bandwidth feature stream.

54. Method for use in performing event detection and object tracking in image streams using a system formed by a set of image acquisition devices, each installed in field where an event is to be detected and connected to a central station through a data network, the method comprising:
   processing a digital format of an image stream, consisting of one or more images, to detect features, being parameters related to attributes of objects in said image stream, and, based on these features, performing the event detection and object tracking, wherein
   providing an image processing server remote from the field, said image processing server being preprogrammed to operate with each of the image acquisition devices on the basis of distribution of image processing algorithms between the image acquisition device and the server, said image processing server being preprogrammed for performing said distribution of image processing algorithms by carrying out the following:
   dynamically determining a threshold value for each feature, which is associated with the event to be detected and which is to be extracted by the set of image acquisition devices from image data acquired thereby in the field, and updating each of the image acquisition devices with the corresponding threshold, thereby enabling the image acquisition device to apply low-level feature extraction to the image stream and selectively generate a features stream upon identifying that a number and type of features in the image stream exceed the corresponding threshold, in response to a feature stream, received from each of the image acquisition devices via the network, applying a high-level processing to the received feature stream to identify events in an image stream to which said feature stream corresponds, and controlling an operational mode of the respective image acquisition device, to thereby enable transmission of output data to an operator.

55. A non-transitory computer readable medium for use in performing event detection and extraction and object tracking, the computer readable medium containing instructions which, when executed by a processor, cause the processor to operate with each of multiple remote image acquisition devices via a communication network on the basis of distribution of image processing algorithms between the image acquisition device and said processor, by selectively carrying out the following:
   dynamically determining a threshold value for each of a plurality of predetermined features, which are parameters related to attributes of objects in an image stream to be captured by at least one of the remote image acquisition devices, and are associated with the event to be detected and extracted by the respective image acquisition device from image data acquired thereby in the field, and updating each of the image acquisition devices with the corresponding threshold, thereby enabling the image acquisition device to apply low-level feature extraction to the image stream and selectively generate a features stream upon identifying that a number and type of the features in the image stream exceed the corresponding threshold, in response to a feature stream, received from at least one of the image acquisition devices via the network, processing the feature stream by applying a high-level processing to the received feature stream to identify events in an image stream to which said feature stream corresponds, and controlling an operational mode of the respective image acquisition device, to thereby enable transmission of output data to an operator.

56. System for use in performing event detection and object tracking in image streams, the system comprising an image processing server configured for connecting via a data network to a set of image acquisition devices each located in field where the event detection is to be performed, said image processing server being preprogrammed to operate with each of the image acquisition devices on the basis of distribution of image processing algorithms between the image acquisition devices and the image processing server, by determining and providing to each of the image acquisition devices a corresponding threshold for each feature that is associated with the event to be detected and is to be extracted by the image acquisition devices from image data acquired thereby and enabling the image acquisition device to apply low-level feature extraction to at least one of the image streams and selectively generate a feature stream corresponding to the image stream upon identifying that a number and type of the features in the image stream exceed the corresponding threshold, the image processing server being responsive to a feature stream, received from each of the image acquisition devices for applying high-level processing to the received feature stream, to control an operational mode of the respective image acquisition device and to identify event in the image stream corresponding to the feature stream, to thereby enable transmission of output data to an operator.

57. A non-transitory computer program, embodied on a computer readable medium, for use in performing event detection and object tracking in image streams, comprising computer program code means which, when run on a computer causes the computer to:
connect, via a data network, an image processing server to a set of image acquisition devices, each located in field where the event detection is to be performed; and
cause the image processing server to operate with each of the image acquisition devices on the basis of distribution of image processing algorithms between the image acquisition devices and the image processing server by determining and providing to each of the image acquisition devices a corresponding threshold for each feature that is associated with the event to be detected and is to be extracted by the image acquisition devices from at least one of the image streams acquired thereby and enabling the image acquisition device to apply low-level feature extraction to the image stream and selectively generate a feature stream corresponding to one of the image streams upon identifying that a number and type of the features in the image stream exceed the corresponding threshold, the image processing server being responsive to a feature stream, received from each of the image acquisition devices for applying high-level processing to the received feature stream, to control an operational mode of the respective image acquisition device and to identify the event in the image stream corresponding to the feature stream, to thereby enable transmission of output data to an operator.

58. The computer program as claimed in claim 57 embedded on a computer readable medium.

* * * * *